(12) United States Patent
Marshall et al.

(10) Patent No.: US 8,287,731 B2
(45) Date of Patent: Oct. 16, 2012

(54) FLUID TANK WITH KIDNEY-LOOP FILTRATION SYSTEM

(75) Inventors: Thomas C. Marshall, Hartford, WI (US); Robert E. Broman, Mequon, WI (US)

(73) Assignee: Helgesen Design Services, LLC, Hartford, WI (US)

( * ) Notice: Subject to any disclaimer, the term of this patent is extended or adjusted under 35 U.S.C. 154(b) by 438 days.

(21) Appl. No.: 12/549,508

(22) Filed: Aug. 28, 2009

(65) Prior Publication Data

US 2010/0051524 A1    Mar. 4, 2010

Related U.S. Application Data

(60) Provisional application No. 61/093,028, filed on Aug. 29, 2008.

(51) Int. Cl.
*B01D 35/147* (2006.01)
*B01D 29/00* (2006.01)

(52) U.S. Cl. ..... 210/254; 210/130; 210/132; 210/195.1; 210/172.6; 210/253; 210/335; 210/339

(58) Field of Classification Search ............... 210/195.1, 210/130, 132, 254, 335, 339, 101, 172.6
See application file for complete search history.

(56) References Cited

U.S. PATENT DOCUMENTS 3,883,430 A * 5/1975 Codo ............................ 210/132
4,832,836 A * 5/1989 Selsdon ........................ 210/133
* cited by examiner

*Primary Examiner* — Benjamin Kurtz
(74) *Attorney, Agent, or Firm* — Reinhart Boerner Van Deuren P.C.

(57) ABSTRACT

A return flow filtration assembly for filtering return hydraulic fluid is provided. The filtration assembly includes a first return fluid chamber including a first inlet and first and second of outlets. The second outlet is configured to be coupled to a secondary return flow filter for providing micro-filtering of the return fluid. The first outlet includes a restriction element for restricting flow through the first outlet and generating an artificial back pressure within the first return fluid chamber to drive fluid through the second outlet, when the second outlet is coupled to a secondary return flow filter.

15 Claims, 6 Drawing Sheets

FLUID TANK WITH KIDNEY-LOOP FILTRATION SYSTEM

CROSS-REFERENCE TO RELATED PATENT APPLICATIONS

This patent application claims the benefit of U.S. Provisional Patent Application No. 61/093,028, filed Aug. 29, 2008, the disclosure and teachings of which are incorporated herein, in their entireties, by reference.

FIELD OF THE INVENTION

This invention generally relates to hydraulic fluid storage tanks and particularly hydraulic fluid storage tanks for hydraulic fluid that is drawn from the tank, circulated through a hydraulic system and then deposited back into the storage tank and more particularly to filtration of the fluid as it returns to the fluid storage tank.

BACKGROUND OF THE INVENTION

Typical hydraulic systems have a hydraulic reservoir (i.e. a hydraulic fluid storage tank) that stores excess hydraulic fluid that is used by the system. The hydraulic fluid is a working fluid that is typically used to drive hydraulic cylinders, pumps, hydraulic motors or other devices for performing desired operations. Typically the hydraulic systems will include a hydraulic pump to pressurize the fluid as it passes through the system to provide adequate power to drive the devices of the system. Additionally, hydraulic systems typically reuse the hydraulic fluid such that the hydraulic fluid is drawn from the storage tank passed through the system and then deposited back into the storage tank where it is held until it is reused by the system again.

To prevent debris or impurities from repeatedly passing through the system, prior art storage tanks, typically includes a return flow filter that may be either internal to the tank or external to the tank that filters the return fluid prior to the fluid being mixed with the rest of the clean fluid being stored in the fluid tank. Unfortunately, the primary filter is typically sized such that smaller particulate is permitted to pass through the filter media so that too large of a pressure drop is not created across the filter and such that the filter can accommodate the large quantity of hydraulic fluid passing through the hydraulic system.

Filtration of these smaller particulates has previously been effectuated by using a kidney-loop filtration system that is a secondary fluid flow loop that is strictly used to filter the fluid and is typically not in-line with the primary hydraulic system. These kidney-loop filtration systems require a second hydraulic pump to drive the fluid through the system. Unfortunately, the use of a second hydraulic pump is expensive and requires the ability to drive the second hydraulic pump making it difficult to integrate the kidney-loop system into the overall system. Typically, the filter elements for the kidney-loop systems require greater pressure to force the fluid through the filter elements.

The present invention relates to improvements over the current state of the art.

BRIEF SUMMARY OF THE INVENTION

The present invention provides an improved fluid tank that includes an improved kidney-loop filtration system. More particularly, the present invention provides an improved fluid tank that includes an improved kidney-loop filtration system that does not require a secondary power source to drive the fluid through the kidney-loop filtration system.

As such, in one embodiment of the present invention, a return flow filtration assembly providing both course and kidney-loop type fine filtering of hydraulic fluid is provided. The filtration assembly includes a first return fluid chamber including a first inlet and first and second of outlets. The second outlet is configured to be coupled to a secondary return flow filter for providing micro-filtering of the return fluid. The first outlet includes a restriction element for restricting flow through the first outlet and generating an artificial back pressure within the first return fluid chamber to drive fluid through the second outlet, when the second outlet is coupled to a secondary return flow filter.

In yet another embodiment, the return flow filtration assembly is positioned within a hydraulic fluid storage tank and the first and second outlets are in fluid communication with a reservoir defined by the hydraulic fluid storage tank.

In one embodiment, the return flow filtration assembly includes a second return fluid chamber in which a primary (i.e. course) return flow filter is positioned while a secondary (fine) return flow filter is positioned within the first return fluid chamber. In this embodiment, the return fluid filter flows "in series" through primary and secondary return fluid filter.

In another embodiment, a primary and a secondary return flow filter are positioned within a same return fluid chamber and the fluid that passes through each of the filters does not also pass through the other one of the filters.

In one embodiment, the restriction element is a spring-loaded valve that opposes flow of the fluid through the first outlet.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
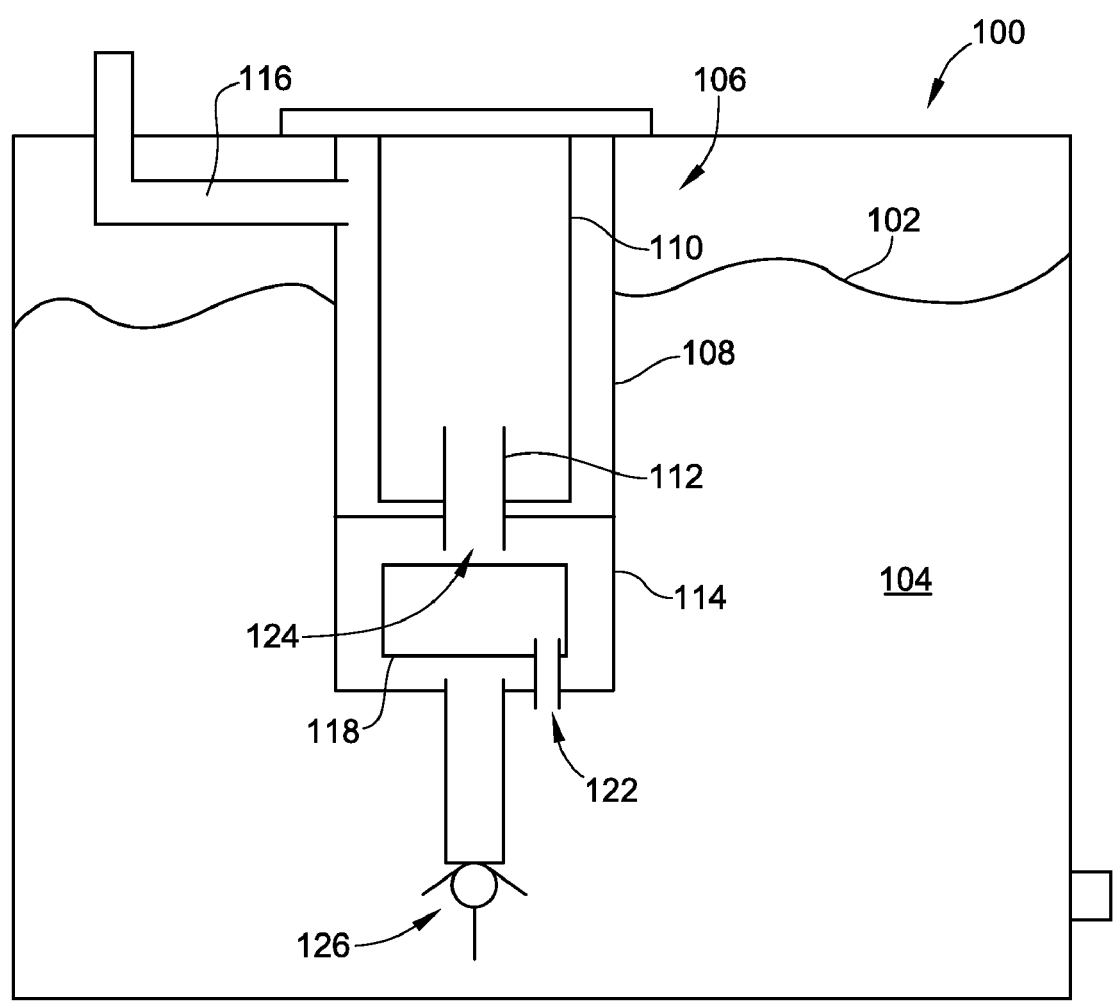
FIG. 1 is a first embodiment of a hydraulic fluid storage tank constructed according to the teachings of the present invention.

Turning now to FIG. 1, a simplified schematic representation of a hydraulic storage tank 100 according to the teachings of the present invention. The storage tank 100 stores hydraulic fluid 102 within reservoir 104 formed by the storage tank 100. The storage tank 100 forms part of a larger hydraulic system (not shown), which draws the hydraulic fluid from the storage tank 100, uses the fluid to power other devices, and then returns the fluid back to the storage tank 100.

The hydraulic storage tank 100 generally includes a return flow filter assembly 106. The return flow filter assembly 106 includes a primary filtration chamber 108 which is generally positioned within reservoir 104 that houses a primary return flow filter 110 which may also be referred to as a filter element. The primary return flow filter 110 functions to filter larger particulate material within the return flow fluid. Additionally, in this embodiment, all of the fluid that is returned to reservoir 104 is passed through the primary flow filter.

A flow passage 112 fluidly communicates the primary filtration chamber 108 with a secondary filtration chamber 114 that is part of the return flow filter assembly 106. The primary return flow filter 110 is fluidly interposed between the return flow inlet 116 of the storage tank 100 and the flow passage 112 such that for fluid to flow through the primary filtration chamber 108 and into the secondary filtration chamber 114, the fluid must pass through the primary return flow filter 110. However, while not necessary for the present invention, the primary return flow filter 110 or the primary filtration chamber 108 may include a bypass valve (not shown) to permit fluid to bypass the primary return flow filter 110 in the event that the primary return flow filter 110 becomes spent to avoid running they system dry of fluid or creating an excessive back pressure that can cause damage to hydraulic system components. Thus, when fluid is flowing through the primary return flow filter 110 (i.e. when it is not spent allowing for bypass) this will be understood as the primary return flow filter 110 being operational.

The secondary filtration chamber 114 includes a secondary return flow filter 118 which may also be referred to as a filter element that is configured to filter smaller particulate than the primary return flow filter 110. This secondary return flow filter 118 functions like a kidney-loop filtration system as it filters smaller particles and typically receives a reduced amount of flow. The secondary filtration chamber 114 includes first and second separate fluid outlets 120, 122 that each fluidly communicate the secondary filtration chamber 114 with the reservoir 104.

The secondary return flow filter 118 is interposed between the outlet 124 of the flow passage 112 and the second fluid outlet 122. Thus, for fluid that passes through the second fluid outlet 122 and into the reservoir 104, the fluid must pass through the secondary return flow filter 118.

The secondary filtration chamber 114 is substantially free of fluid restriction between the outlet 124 of the flow passage 112 and the first fluid outlet. As such, the first fluid outlet includes a flow restriction device 126. This flow restriction device 126 is required to create artificial back pressure within the secondary filtration chamber 114 sufficient to force fluid through the secondary return flow filter 118 and the second fluid outlet 122. Without the flow restriction device 126, the fluid would substantially, if not entirely, bypass the secondary return flow filter 118.

In the illustrated embodiment, the flow restriction device 126 is in the form of a spring loaded pressure relief valve that only opens upon sufficient pressure build up within secondary filtration chamber 114. Thus, the flow restriction device 126 can be calibrated depending on the amount of flow that is desired to pass through the secondary return flow filter 118 or the amount of pressure that is required to force fluid through the secondary return flow filter 118.

In this embodiment, the primary and secondary return flow filters 110, 118 are substantially in series with one another. Thus, all fluid that passes through the secondary return flow filter 118 must first pass through the primary return flow filter 110.

Further, it should be noted that not all of the fluid flow passing through the return flow filtration assembly 106 will be micro-filtered, i.e. passed through the secondary return flow filter 118. However, over time, as the fluid is repeatedly circulated through the attached hydraulic system and repeatedly passed through the return flow filtration assembly 106, the fluid will pass through the secondary return flow filter 118. Ultimately, the hydraulic fluid 102 will become cleaner as this system allows for removal of smaller particulate than merely using only the primary return flow filter 110.

Additionally, this system provides the significant benefit of directly incorporating the kidney-loop system (i.e. secondary return flow filter 118) directly into the return flow filtration assembly 106 such that a secondary fluid pump is not required to effectuate micro-filtering of the fluid, as is typically required in prior art systems.

While being illustrated as system that is internal to the storage tank 100, the return flow filtration assembly 106 can be external to the storage tank 100 such that the return flow filtration assembly 106 could be an add-on component to existing tanks. Further, while the return flow filtration assembly 106 is illustrated as a single housing that forms both the primary and secondary filtration chambers 108, 114, these two chambers 108, 114 could be formed by separate independent bodies that are coupled by flow passage 112.

Figure 2:
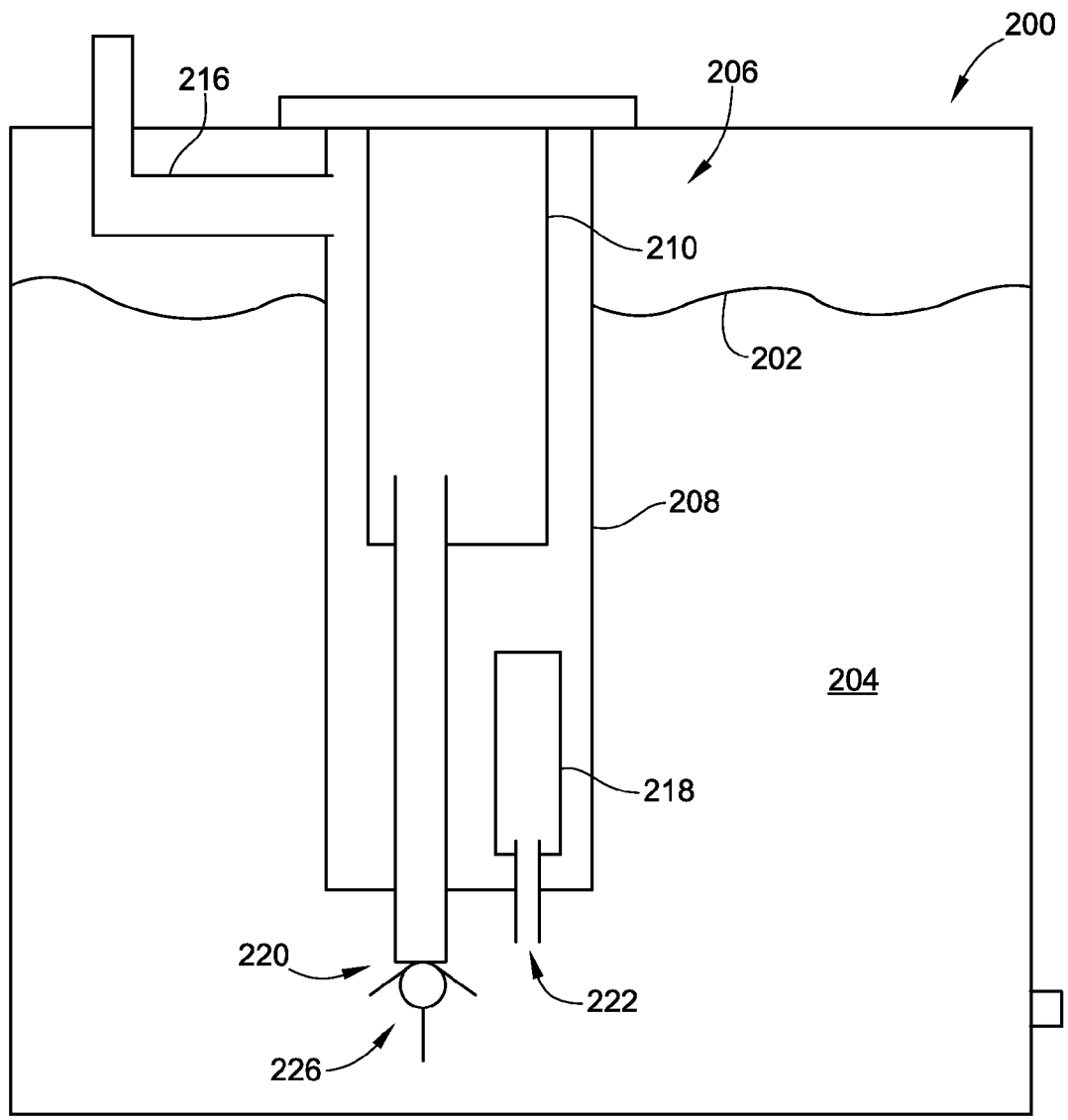
FIG. 2 is a second embodiment of a hydraulic fluid storage tank constructed according to the teachings of the present invention.

A second embodiment of a hydraulic fluid storage tank 200 according to the teaching of the present invention is illustrated in FIG. 2. This hydraulic fluid storage tank 200 includes a return flow filtration assembly 206 that functions to include some micro-filtration. However, this return flow filtration assembly 206 includes primary and secondary return flow filters 210, 218 that are generally aligned in parallel with one another.

Thus, unlike the previous embodiment, the fluid that passes through the secondary return flow filter 218 does not pass through the primary return flow filter 210.

In this embodiment, both the primary and secondary return flow filters 210, 218 are located within the same filtration chamber 208. Filtration chamber 208 includes a pair of first and second fluid outlets 220, 222 that fluidly communicate the filtration chamber 208 with the reservoir 204. In this embodiment, the primary return flow filter 210 is fluidly interposed between the return flow inlet 216 of the filtration chamber 208 and the first fluid outlet 220 while the secondary return flow filter 210 is fluidly interposed between the return flow inlet and the second fluid outlet 222.

In this arrangement, as the primary return flow filter 210 is a high flow filter that does not filter out as small of particles as the secondary return flow filter 218, less pressure is required to force the fluid through the primary return flow filter 210 than the secondary return flow filter 218. Thus, again, the first fluid outlet 220 includes a restriction element 226 that artificially creates back pressure opposing fluid flow through the first outlet 220. This artificial back pressure assists in forcing a desired amount of fluid flow through the secondary return flow filter 218.

Again, this system effectuates micro-filter of at least part of the fluid passing through the return flow filtration assembly 206 to remove smaller particulate from the fluid 202 without requiring a secondary fluid pump. Instead, the pressure created by the primary hydraulic system's pump is all that is required to drive the hydraulic fluid through the secondary return flow filter 218.

While the first system is desirable as it provides for pre-filtering the fluid prior to the fluid getting to the secondary return flow filter 118, thus reducing the amount of particle buildup on the secondary return flow filter 118, the second system allows for easier implementation into tanks that already have a return flow filtration assembly incorporated, but that only include a primary filter.

Figure 3:
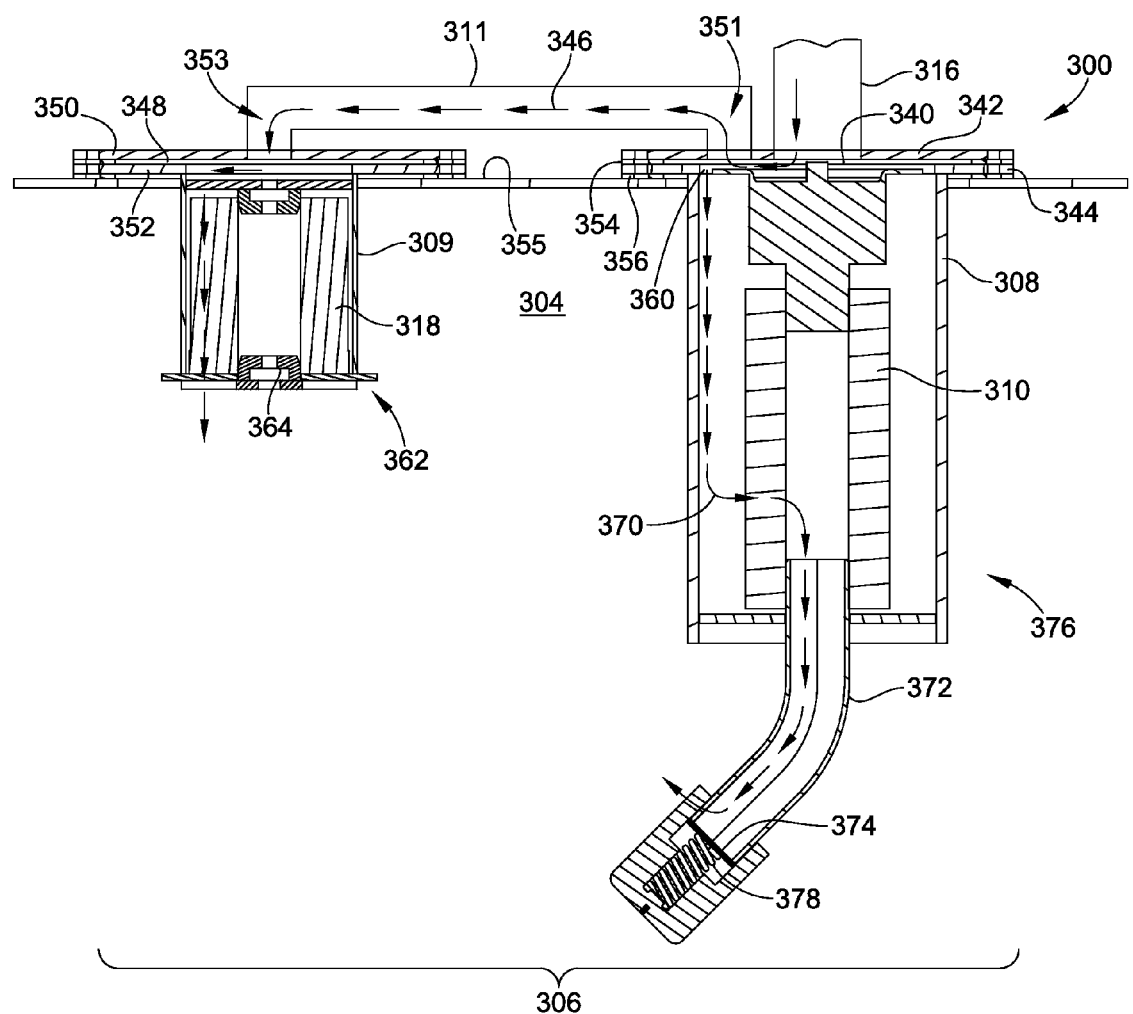
FIGS. 3-5 are more detailed illustrations of an embodiment of a fluid storage tank constructed in accordance with the embodiment of FIG. 2.

With reference to FIG. 3, a more detailed cross-section of an embodiment of a hydraulic fluid storage tank 300 according to the teachings of an embodiment of the present invention is illustrated. This storage tank 300 is similar to the embodiment illustrated in simplified form in FIG. 2 because the primary and secondary return flow filters 310, 318 are arranged in parallel and fluid that passes through primary return flow filter 310 does not pass through secondary return flow filter 318.

In this embodiment, the primary return flow filter 310 is housed in primary filtration chamber 308 while secondary return flow filter 318 is housed in secondary filtration chamber 309, unlike the schematic representation in FIG. 2. Thus, the return flow filtration assembly 306 is formed by the combination of the two separate filtration sub-assemblies (generally housed within filtration chambers 308 and 309).

Return fluid is returned to the storage tank 300, and particularly to return flow filtration assembly 306 via return flow inlet 316. Fluid then enters into a primary fluid manifold 340 formed between spaced apart top and bottom cover plates 342, 344.

Figure 4:
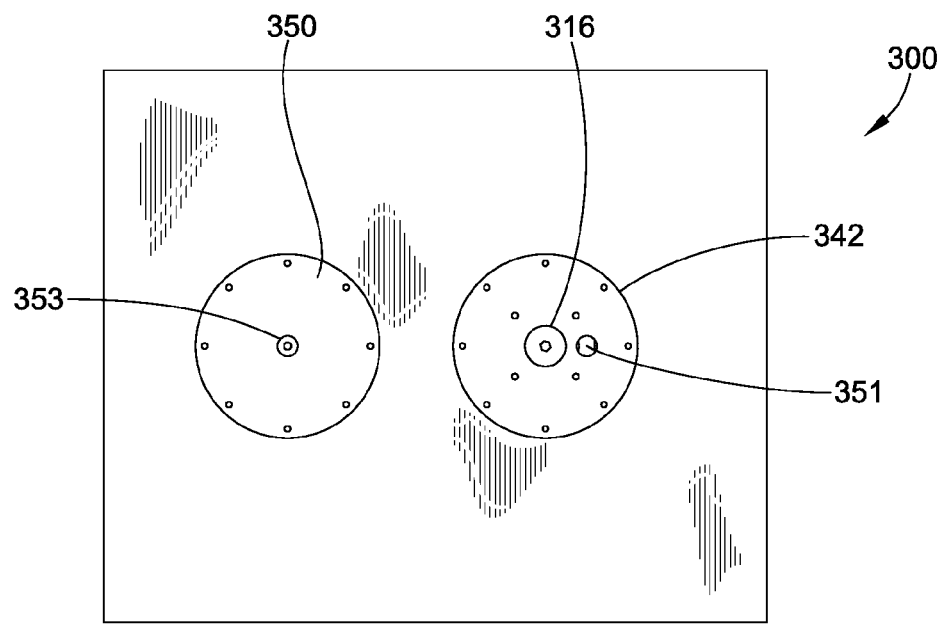

A first portion of the return fluid (illustrated by arrows 346 is transferred from primary fluid manifold 340 to secondary fluid manifold 348 generally formed between top and bottom cover plates 350, 352. That portion of the return fluid 346 is transferred between the two separate manifolds 340, 348 via fluid conduit 311 which is external to the internal cavity 304 of the fluid storage tank 300. Conduit 311 connects outlet 351 with inlet 353 (see also FIG. 4).

The top and bottom cover plates 342, 344 of the primary fluid manifold 340 are separated by a gasket 354 and the bottom cover plate 344 is sealingly mounted to the outer surface 355 of a sidewall forming the storage tank 300 by gasket 356. Similarly, gasket 358 separates top and bottom cover plates 350, 352 to form the secondary fluid manifold 348. Clearly, other arrangements for forming the manifolds is contemplated. The gasket may be any material such as metal, rubber, paper, etc. that can withstand the pressures exposed thereto and that are compatible with the respective fluids.

The first portion of return fluid 346 passes through filtration chamber 309 as well as secondary return flow filter 318 and into the internal cavity 304 of the storage tank 300. In the illustrated embodiment, the secondary return flow filter 318 is an annular filter media plugged at a top end, i.e. proximate manifold 348 and open at an opposite end for discharge of fluid 346 into the storage tank 300. Filtration chamber 309 includes an end plate arrangement 362 that seals the clean side of the filter media from the dirty side forcing the fluid to pass through the filter 318 from the dirty side to the clean side as it flows from manifold 348 to internal cavity 304 of the storage tank 300. Seal 364 seals the secondary return flow filter 318 to the end plate arrangement 362.

Figure 5:
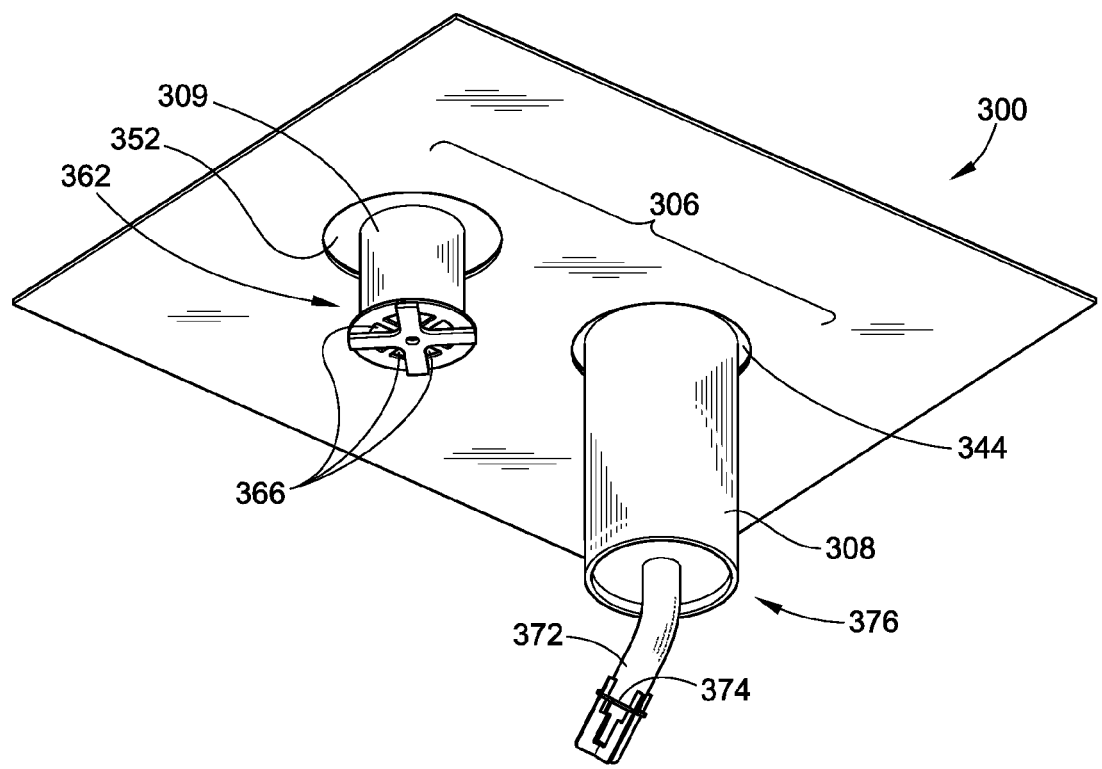

With reference to FIG. 5, the end plate arrangement has a plurality of angularly spaced apart outlets 366. The end plate arrangement 362 is formed of two separate components. The size of the outlets 366 can be adjusted to adjust the amount of back pressure generated by the secondary filtration assembly of the return flow filtration assembly 306.

Notably, at least one of the cover plates in the pairs of cover plates 342, 344 or 350, 352 are sized larger than a corresponding hole within top surface 355 through which filtration chambers 308, 309 extend such that there is an overlapping arrangement to permit mounting the individual filtration assemblies to the storage tank.

A second portion of the return fluid, illustrated by arrows 370 passes from primary fluid manifold 340 into filtration chamber 308 which houses primary return flow filter 318. Again, primary return flow filter 310 is an annular ring of filtration media.

An outlet pipe 372 connects a clean side of the primary return flow filter 310 with the internal cavity 304. The inlet of the outlet pipe 372 is sealed within the primary return flow filter 310 so as to prevent dirty fluid short circuiting the filter media of the primary return flow filter 310.

The outlet pipe 372 has a flow regulator plate 374 that selectively adjust the amount of back pressure provided by the primary filtration assembly 376. Again, if the pressure exposed to the first portion of fluid flow 346 is not balanced relative to flow 370, all fluid will pass through only one of the primary and secondary return flow filters 310, 318 rather than both. The regulator plate 374 may be biased toward the outlet pipe 372 by a spring member 378 to regulate the pressure of flow 370. This spring force can be adjusted to adjust the amount of back pressure generated to coordinate the desired amounts of flows for the first and second flow portions 346, 370 to get the desired amount of primary and secondary filtration. In the illustrated embodiment, the regulator plate 374 moves axially relative to outlet pipe 372. However, in alternative embodiments, the regulator plate 374 could pivot relative to the outlet end of the outlet pipe 372.

A significant benefit of having the two separate assemblies is that if the primary and secondary return flow filters 310, 318 needs replacing at different maintenance intervals, the operator has quick and easy access to the particular filter that needs replaced.

Notably, the primary and secondary return flow filters 310, 318 are interposed between return flow inlet 316 and their respective outlets, namely outlets 366 and outlet pipe 372.

Figure 6:
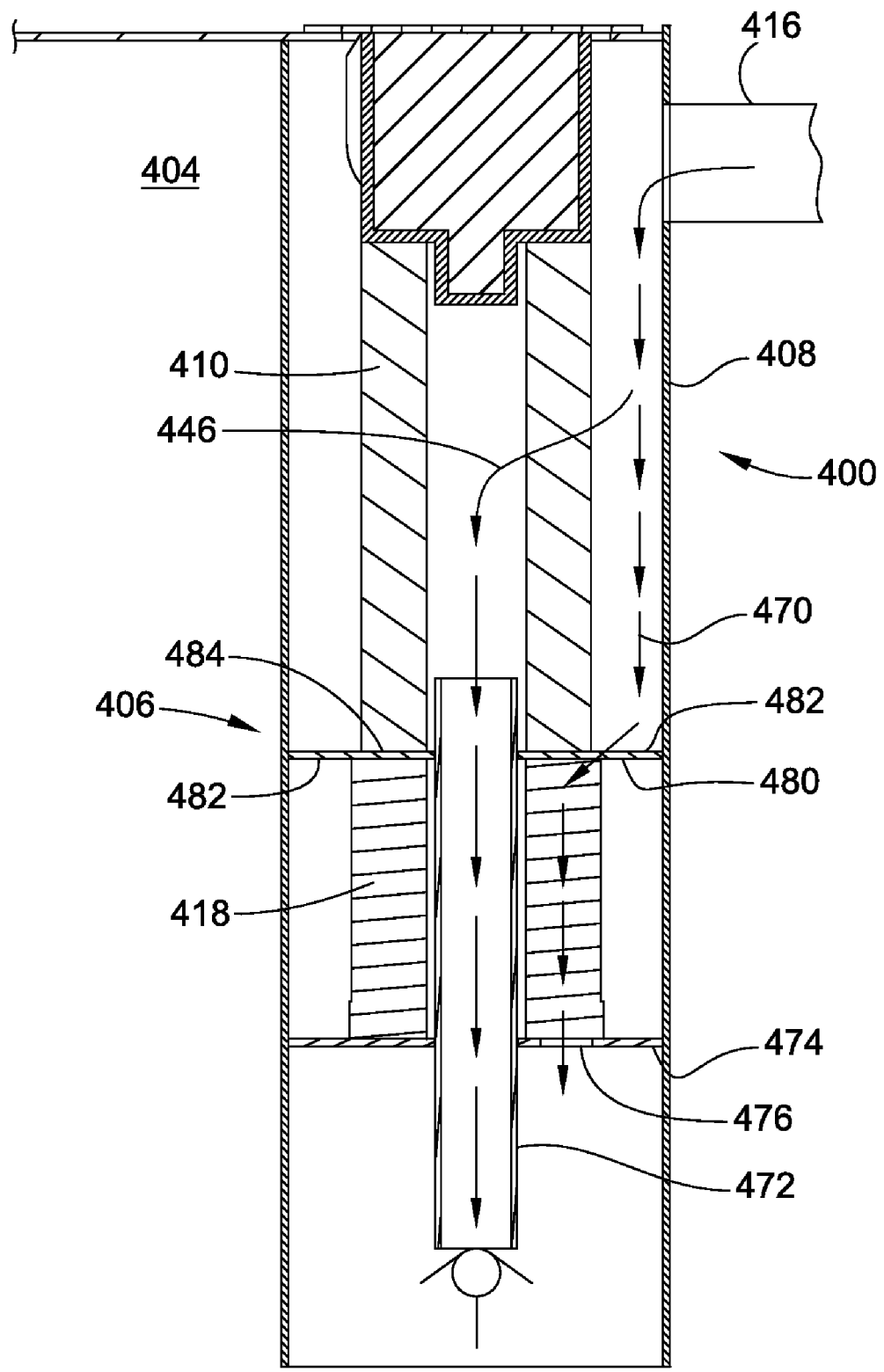
FIGS. 6 and 7 are more detailed illustrations of an embodiment of a fluid storage tank constructed in accordance with the embodiment of FIG. 2 that is different than the embodiment of FIGS. 3-5.
Figure 7:
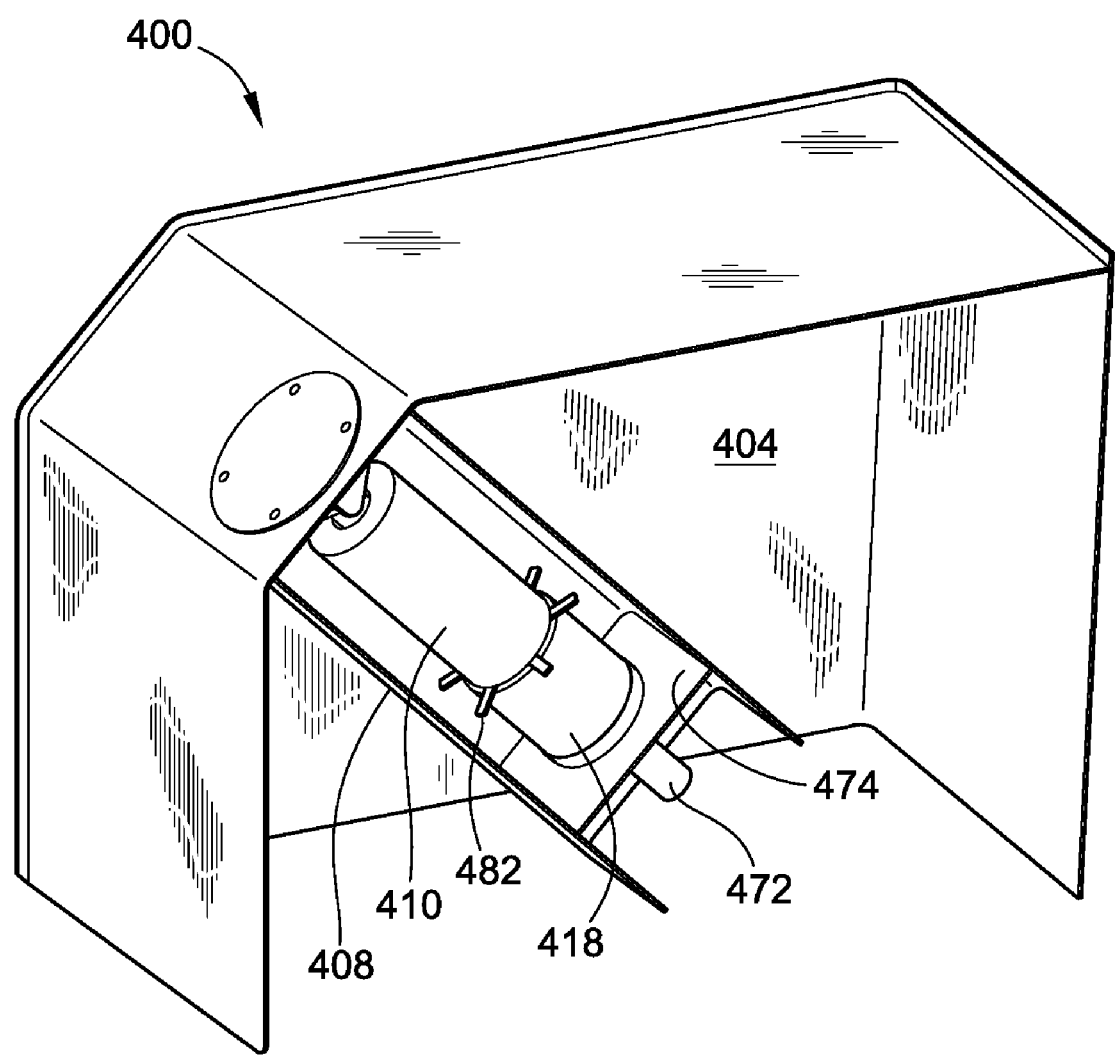

FIG. 6 illustrates a further embodiment of a storage tank 400 for storing flood within an internal cavity 404 thereof. The storage tank 400 includes a return flow filtration assembly 406 that is similar to the embodiment illustrated in simplified form in FIG. 2 because the primary and secondary return flow filters 410, 418 are arranged in parallel and fluid that passes through primary return flow filter 410 does not necessarily pass through secondary return flow filter 418.

In this embodiment, both the primary and secondary return flow filters 410, 418 are housed in filtration chamber 408. Return fluid is returned to the storage tank 400, and particularly to return flow filtration assembly 406 via return flow inlet 416 and more particularly into filtration chamber 408.

A first portion of the fluid 446 passes through primary return flow filter 410 while a second portion of the fluid 470 passes through the secondary return flow filter 418. Again, this provides different types of filtration for the two different fluid flow portions 446, 470.

Both the primary and secondary return flow filters 410, 418 are annular filters.

In this embodiment, a primary outlet pipe 472 passes from a clean side of the primary return flow filter 410 to the interior 404 of the storage tank 400. The primary outlet pipe 472 passes axially through an internal cavity formed by secondary return flow filter 418. Thus, the secondary return flow filter

418 circumscribes the primary outlet pipe 472. The first portion of fluid flow 446 passes through the outlet pipe 472 as it is returned back to the interior 404 of the storage tank 400.

An end plate 474 defines an end of the filtration chamber 408. This end plate includes apertures 476 through which the second portion of fluid flow 470 passes after it passes through the secondary return flow filter 418.

A spacer disk 480 axially separates the primary and secondary return flow filters 410, 418. The spacer disk 480 generally includes a plurality of angularly spaced apart spokes 482 that extend radially outward from a central hub region 484. The second portion of fluid flow 470 passes through the gaps formed between adjacent ones of the spokes 482 as it travels through the filtration chamber 408 prior to passing through the secondary return flow filter 418. The return pipe 472 passes through a central aperture through the central hub region 484 and is preferably sealed to the central hub region 484.

Notably, in this design, if only secondary return flow filter 418 needs to be replaced, the primary return flow filter 410 must also be removed as the filters are both removed through a same opening in the sidewall of the storage tank 400. Further, in this embodiment, one of the sidewalls defining the interior cavity 404 of the storage tank 400 is used to define a portion of the filtration chamber 408 in which the filters 410, 418 are housed.

Further, while not illustrated, a regulator plate could be added to the end of outlet pipe 472 so as to regulate pressure as discussed with previous embodiments.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A return flow filtration assembly for providing both primary filtering and secondary type fine filtering of hydraulic return fluid comprising:
    a return fluid chamber arrangement comprising a first inlet and first and second outlets;
    primary and secondary return flow filters within the return fluid chamber arrangement; and
    wherein at least one of the first and second outlets includes a restriction element for restricting flow through the at least one of the first and second outlets and increasing a pressure through that outlet to drive fluid through the other one of the at least one of the first and second outlets such that a portion of the fluid flow through the return fluid chamber arrangement passes through at least one of the primary and secondary return flow filters; and
    a hydraulic fluid storage tank, the first and second outlets are in operable fluid communication with a reservoir defined by the hydraulic fluid storage tank; and
    wherein the return fluid chamber arrangement is substantially positioned within the fluid storage tank.

2. The return flow filtration assembly of claim 1, wherein the secondary return flow filter is coupled to the second outlet, the secondary return flow filter being fluidly interposed between the first inlet and the second outlet; the restriction element providing sufficient back pressure to the first outlet to force a portion of the fluid within the return fluid chamber arrangement through the secondary return flow filter.

3. The return flow filtration assembly of claim 2, wherein the primary return flow filter is operably coupled to the first outlet and being fluidly interposed between the first inlet and the first outlet.

4. The return flow filtration assembly of claim 3, wherein the primary and secondary return flow filters are arranged in parallel such that a first portion of a return fluid passes only through the primary return flow filter and the first outlet and a second portion of the fluid entering the first return fluid chamber passes only through the secondary return flow filter.

5. The return flow filtration assembly of claim 4, wherein the return fluid chamber arrangement includes a plurality of chambers including a first return fluid chamber including the primary return flow filter and a secondary return fluid chamber including the secondary return flow filter, both chambers downstream from the first inlet.

6. The return flow filtration assembly of claim 5, further comprising a fluid manifold upstream of both of the primary and secondary return fluid chambers and downstream of the first inlet, the manifold separating the fluid flow through the first inlet into the first and second portions of fluid.

7. The return flow filtration assembly of claim 6, wherein the secondary return flow filter filters smaller particles from the fluid than the primary flow filter.

8. The return flow filtration assembly of claim 1, wherein the return fluid chamber arrangement is comprised of a plurality of chambers including a first return fluid chamber and a second return fluid chamber, the primary return flow filter element within the first return fluid chamber and the secondary return flow filter element within the second return fluid chamber, wherein the first return flow filter element is interposed between the first inlet and both of the first and second outlets such that flow paths from the first inlet to the first and second outlets both pass through the first return fluid chamber and both flow paths pass through the primary return flow filter element.

9. The return flow filtration assembly of claim 8, wherein the secondary return flow filter is within the second return fluid chamber and only forms part of the flow path from the first inlet to the first outlet, such that only the portion of the flow that passes through the first outlet passes through the secondary return flow filter, the restriction element providing sufficient back pressure to the second outlet to force the portion of the fluid through the secondary return flow filter, wherein the primary and secondary return flow filter are arranged in series such that all of the fluid that passes through the secondary return flow filter has previously passed through primary return flow filter, when the primary return flow filter is operating.

10. A return flow filtration assembly for providing both primary filtering and secondary type fine filtering of hydraulic return fluid comprising:
a return fluid chamber arrangement comprising a first inlet and first and second outlets;
primary and secondary return flow filters within the return fluid chamber arrangement;
wherein at least one of the first and second outlets includes a restriction element for restricting flow through the at least one of the first and second outlets and increasing a pressure through that outlet to drive fluid through the other one of the at least one of the first and second outlets such that a portion of the fluid flow through the return fluid chamber arrangement passes through at least one of the primary and secondary return flow filters;
wherein the return fluid chamber arrangement is comprised of a plurality of chambers including a first return fluid chamber and a second return fluid chamber, the primary return flow filter element within the first return fluid chamber and the secondary return flow filter element within the second return fluid chamber, wherein the first return flow filter element is interposed between the first inlet and both of the first and second outlets such that flow paths from the first inlet to the first and second outlets both pass through the first return fluid chamber and both flow paths pass through the primary return flow filter element;
wherein the secondary return flow filter is within the second return fluid chamber and only forms part of the flow path from the first inlet to the first outlet, such that only the portion of the flow that passes through the first outlet passes through the secondary return flow filter, the restriction element providing sufficient back pressure to the second outlet to force the portion of the fluid through the secondary return flow filter, wherein the primary and secondary return flow filter are arranged in series such that all of the fluid that passes through the secondary return flow filter has previously passed through primary return flow filter, when the primary return flow filter is operating; and
wherein the second outlet is not directly coupled to either the primary or secondary return flow filters and is freely exposed to the second return flow chamber such that the portion of flow that does not pass through the secondary return flow filter passes through the second return fluid chamber and out the second outlet.

11. The return flow filtration assembly of claim 10, wherein the restriction element is a spring-loaded valve.

12. The return flow filtration assembly of claim 11, wherein the spring-loaded valve is adjustable to vary the amount of back pressure provided.

13. The return flow filtration assembly of claim 1, wherein the restriction element is a spring-loaded valve.

14. The return flow filtration assembly of claim 13,
wherein the spring-loaded valve is adjustable to vary the amount of back pressure provided.

15. The return flow filtration assembly of claim 1, wherein a portion of the fluid flow through the first inlet passes through only one of the primary and secondary return flow filters.

* * * * *